United States Patent [19]

Berkau et al.

[11] 3,969,324

[45] July 13, 1976

[54] CONTINUOUS PROCESS FOR DRYING, CRYSTALLIZING AND SOLID STATE POLYMERIZING POLYESTERS

[75] Inventors: Eugene E. Berkau, Cincinnati, Ohio; Cecil W. Capps, Raleigh, N.C.

[73] Assignee: Monsanto Company, St. Louis, Mo.

[22] Filed: Nov. 12, 1973

[21] Appl. No.: 415,055

Related U.S. Application Data

[63] Continuation of Ser. No. 217,515, Jan. 13, 1972, abandoned.

[52] U.S. Cl. .......................... 260/75 T; 260/75 M; 260/75 R
[51] Int. Cl.² ..................................... C08G 63/46
[58] Field of Search .................. 260/75 M, 75 T

[56] References Cited
UNITED STATES PATENTS

| 3,014,011 | 12/1961 | Zoetbrood | 260/75 |
|---|---|---|---|
| 3,535,285 | 10/1970 | Breiner et al. | 260/75 |
| 3,544,523 | 12/1970 | Maxion | 260/75 |
| 3,544,525 | 12/1970 | Balint et al. | 260/75 |
| 3,586,647 | 6/1971 | Kremer | 260/2.5 |
| 3,634,359 | 1/1972 | Breitschaft et al. | 260/75 |
| 3,657,388 | 4/1972 | Schweizer et al. | 260/873 |

FOREIGN PATENTS OR APPLICATIONS

| 732,266 | 10/1969 | Belgium |
|---|---|---|
| 1,804,551 | 5/1970 | Germany |
| 2,041,018 | 3/1971 | Germany |
| 1,262,941 | 2/1972 | United Kingdom |

*Primary Examiner*—Harold D. Anderson
*Attorney, Agent, or Firm*—Robert L. Broad, Jr.

[57] ABSTRACT

A continuous process is provided for the drying, crystallizing and solid state polymerization of fiber-forming crystallizable polyesters by subjecting polyester pellets of a specific viscosity of about 0.34, with a carboxyl concentration of about 15 milequivalents per gram and a particle size of between −10 and +20 mesh, to a temperature of not more than about 80°C. until the water content of the flake is below 0.05%; and then raising the temperature to about 230°–240°C. until the specific viscosity of the polymer is equal to or greater than about 0.55.

4 Claims, 1 Drawing Figure

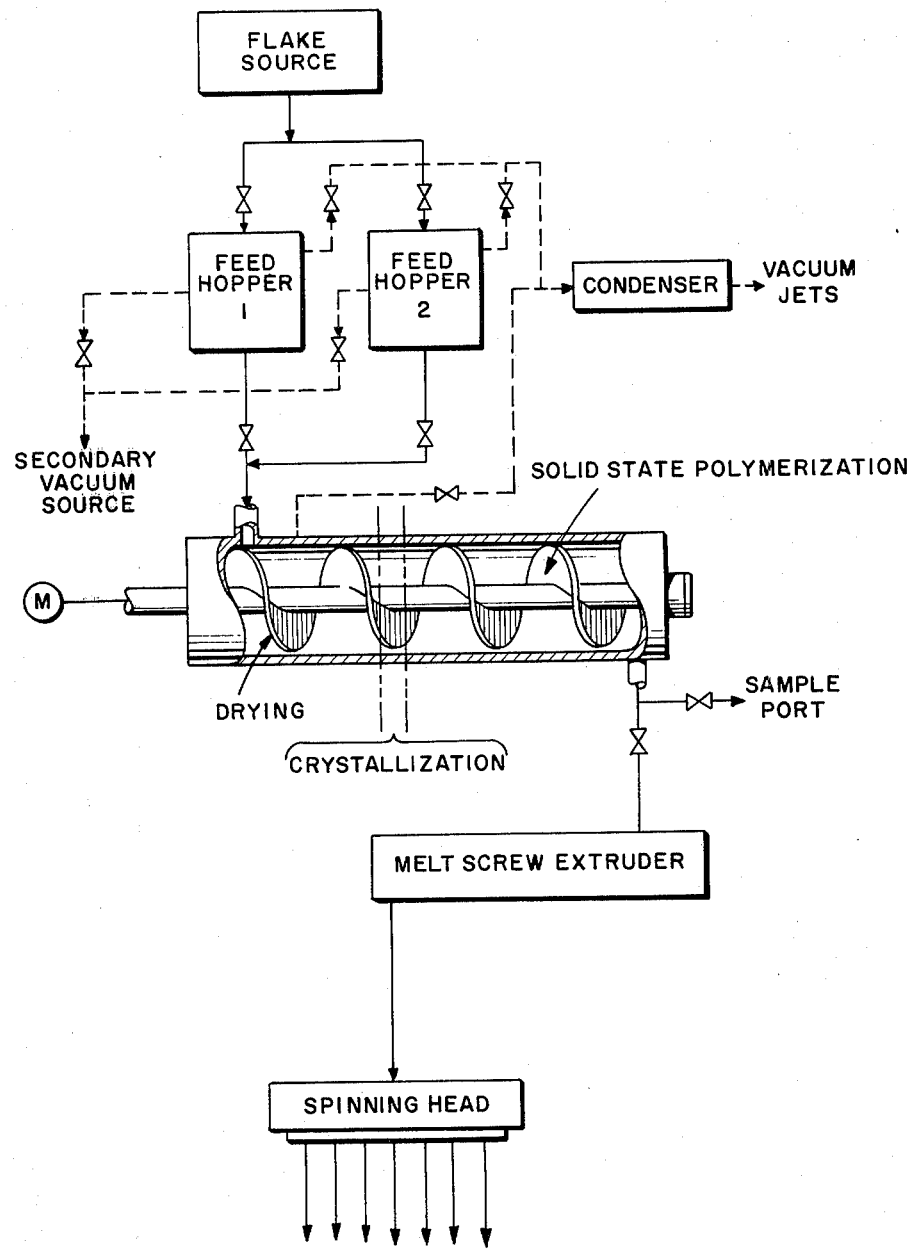

CONTINUOUS PROCESS FOR DRYING, CRYSTALLIZING AND SOLID STATE POLYMERIZING POLYESTERS

This application is a continuation of application Ser. No. 217,515, filed Jan. 13, 1972, now abandoned.

This invention relates to polyesters produced by condensation reactions of polymethylene glycols and dicarboxylic acids or reactive derivatives thereof. It is well known that some polymeric polyesters prepared by the condensation of a glycol or its functional derivatives and the dicarboxylic acid or a polyester-forming derivative thereof, such as an acid halide, a salt, or a simple ester of a dibasic acid, and a volatile monohydric alcohol are excellent fiber-forming polymers. Commercially, high polymeric polyesters are prepared, for example, by the condensation of terephthalic acid or dimethyl terephthalate and a polymethylene glycol containing from about 2 to 10 carbon atoms. These polyesters are relatively insoluble, chemically inactive, hydrophobic materials capable of being formed into filaments which can be cold-drawn to produce textile fibers of superior strength and pliability.

It is also well known to use a solid state polymerization phase as a means of obtaining the ultra high molecular weight polymers necessary in the production of polyester commercial grade and tire yarns. Solid state polymerization is generally considered advantageous in that the handling of the ultra-high viscosity polymers is avoided during the polymerization phase; and thereby thermal degradation during that part of the polymerization is avoided. In melt polymerization, the major part of the reaction is transesterification due to the fact that thermal pyrolysis nullifies much of the esterification of carboxyl end groups. A much larger percentage of the reaction in the solid state polymerization is esterification. It can therefore be expected that a higher molecular weight may be obtained in solid state polymerization with a lower carboxyl concentration than that which can be achieved by melt polymerization.

Most prior art solid state polymerization processes involved fluidized bed operations. Fluidization of particles require the flow of inert gases and/or vapors which must then be cleaned and recirculated. Most of these processes are of the batch variety, and many have slow reaction rates. To speed up the reaction rate, the size of the particles is normally decreased; a very costly operation. But even with the small size particles, reaction times are exceedingly long.

It is therefore an object of this invention to provide a process whereby relatively large particle sizes of flake, within limits ordinarily generated by flaking machines, can be continuously solid state polymerized in a process which also accomplishes drying and crystallization in transitionally coordinated steps.

Another object of this invention is to utilize the heat of crystallization in a solid state polymerization process.

Generally, the objects of this invention are accomplished in a continuous drying, crystallizing and solid state polymerization process in a vessel having conveyance means, preferably a screw conveyor in which dwell time, temperature and pressure can be carefully controlled; and in which temperature can be varied according to the phase.

The single Figure of the drawing schematically shows apparatus which can be used to carry out the continuous drying, crystallization and solid state polymerization process of the present invention.

Referring now in detail to the drawing, undryed and an uncrystallized flake is fed continuously from the flake source to a feed hopper which is under vacuum. Two hoppers are in use alternatively to assure a continuous process. From the feed hopper, the flake descends into a vessel in which drying, crystallization and solid state polymerization occurs. The vessel is generally cylindrical in shape and houses a screw conveyor which may be agitated. Speed of the screw conveyor, pressure within the vessel, and temperature within each of the phases in the vessel are subject to control. A sample port is provided at the exit end of the vessel. From the exit end of the vessel, the solid polymer flake is conveyed into a melt screw extruder, and thereafter into the spinning head. The melt screw extruder may be separate, as in the drawing, or incorporated into the polymerization vessel.

EXAMPLE

The flake has a specific viscosity of about 0.34, a carboxyl concentration of about 15 milequivalents per gram, and a particle size of between −10 and +20 mesh. [Specific viscosity may be measured, for example, at a given concentration (½–4%) of the polymer in a solvent having a mole ratio; 2 phenol/1 trichlorophenol.] The feed hoppers are alternated to provide a continuous supply to the vessel. The first section of the vessel is used for drying the flake to below 0.05%, preferably below 0.3% $H_2O$. Dwell time in this phase is 1–2 hours at a temperature of about 80°C. and a pressure of about 0.5 millimeters mercury. Conditions in the crystallization portion of the vessel are the same as in the drying portion, except that the temperature will vary between the 80° temperature of drying and the 230°–240° temperature of solid state polymerization. Solid state polymerization will occur under the same pressure (0.5 mm Hg), with a dwell time of 2–4 hours, and the temperature above specified. This section is designed to yield a polymer of approximately 0.55 specific viscosity or higher if desired. The carboxyl concentration will preferably be low, but would depend in part upon the concentration of the starting material. The agitator speed should be high enough to prevent sticking of the flake during crystallization.

The melt screw extruder, whether a separate unit as shown, or whether integral within the vessel should be built to impart a minimum amount of shear and dwell time in order to minimize thermal pyrolysis.

We claim:

1. A continuous process for drying, crystallizing and solid state polymerizing of fiber-forming crystallizable polyesters comprising conveying in a screw-type conveyor in a partial vacuum of about 0.5 mm Hg. through the transitionally coordinated steps of: (1) drying pellets of a specific viscosity of about 0.34, a carboxyl concentration of about 15 milequivalents per gram, and a particle size of between −10 and +20 mesh, at a temperature of not more than about 80°C until the water content of the flake is below 0.05%; then (2) crystallizing the pellets in a second zone during which the temperature is raised to about 230° – 240°C; and (3) solid state polymerizing the pellets at about 230° – 240°C until the specific viscosity of the polymer is about equal to or greater than 0.55.

2. The process of claim 1 wherein the conditions of step (1) are maintained for a period of about 1–2 hours.

3. The process of claim 1 wherein the conditions of step (2) are maintained for about 2–4 hours.

4. The process of claim 1 wherein the conditions of step (1) are maintained until the water content of the flake is below about 0.03%.

* * * * *